(12) United States Patent
Brancheriau

(10) Patent No.: US 6,676,202 B2
(45) Date of Patent: Jan. 13, 2004

(54) STRUCTURAL ASSEMBLY FOR DASHBOARD

(75) Inventor: Christian Brancheriau, Meru (FR)

(73) Assignee: Faureceia Interieur Industrie, Nanterre (FR)

(*) Notice: Subject to any disclaimer, the term of this patent is extended or adjusted under 35 U.S.C. 154(b) by 0 days.

(21) Appl. No.: 10/324,038

(22) Filed: Dec. 20, 2002

(65) Prior Publication Data

US 2003/0122403 A1 Jul. 3, 2003

(30) Foreign Application Priority Data

Dec. 27, 2001 (FR) .............................. 01 16946

(51) Int. Cl.$^7$ ................................. B60J 7/00
(52) U.S. Cl. ......................... 296/208; 296/70
(58) Field of Search ................. 296/208, 188, 296/192, 70, 189, 205; 52/693, 646; 280/798

(56) References Cited

U.S. PATENT DOCUMENTS

| | | | | |
|---|---|---|---|---|
| 4,559,868 A | * | 12/1985 | Nonaka et al. ............. 454/127 |
| 4,733,739 A | * | 3/1988 | Lorenz et al. ................ 296/72 |
| 5,088,571 A | * | 2/1992 | Burry et al. .................. 296/70 |
| 5,273,310 A | * | 12/1993 | Terai ............................ 296/70 |
| 5,311,960 A | * | 5/1994 | Kukainis et al. ............. 296/70 |
| 5,358,300 A | | 10/1994 | Gray |
| 5,549,344 A | * | 8/1996 | Nishijima et al. ............ 296/70 |
| 5,556,153 A | * | 9/1996 | Kelman et al. ............. 296/192 |
| 5,564,515 A | * | 10/1996 | Schambre .................... 296/70 |
| 5,673,964 A | * | 10/1997 | Roan et al. ................. 296/208 |
| 5,676,216 A | * | 10/1997 | Palma et al. ................. 296/70 |
| 5,685,598 A | * | 11/1997 | Inoue et al. .................. 296/70 |
| 5,707,100 A | * | 1/1998 | Suyama et al. ............. 296/208 |
| 5,762,395 A | * | 6/1998 | Merrifield et al. .......... 296/208 |
| 5,934,744 A | * | 8/1999 | Jergens et al. .............. 296/208 |
| 5,997,078 A | * | 12/1999 | Beck et al. ................. 296/208 |
| 6,073,987 A | * | 6/2000 | Lindberg et al. .............. 296/70 |
| 6,110,037 A | * | 8/2000 | Yoshinaka .................. 296/208 |
| 6,155,631 A | * | 12/2000 | Yoshinaka et al. .......... 296/188 |
| 6,186,885 B1 | * | 2/2001 | Ahn et al. .................. 454/121 |
| 6,196,588 B1 | * | 3/2001 | Sugawara .................... 280/779 |
| 6,203,092 B1 | * | 3/2001 | Yoshinaka .................. 296/208 |
| 6,237,956 B1 | * | 5/2001 | Haba et al. ................. 296/194 |
| 6,250,678 B1 | * | 6/2001 | Yoshinaka et al. .......... 296/189 |
| 6,273,495 B1 | * | 8/2001 | Haba et al. ................. 296/208 |
| 6,305,733 B1 | * | 10/2001 | Rahmstorf et al. ........... 296/70 |
| 6,378,934 B1 | * | 4/2002 | Palazzolo et al. ........... 296/208 |
| 6,394,527 B2 | * | 5/2002 | Ohno et al. .................. 296/70 |
| 6,409,590 B1 | * | 6/2002 | Suzuki et al. ................ 296/70 |
| 6,422,633 B2 | * | 7/2002 | Neuss et al. .................. 296/70 |
| 6,447,041 B1 | * | 9/2002 | Vandersluis et al. ........ 296/208 |
| 6,502,897 B2 | * | 1/2003 | Neuss et al. ................ 296/208 |
| 6,520,849 B1 | * | 2/2003 | Greenwald et al. ......... 296/208 |
| 6,536,802 B1 | * | 3/2003 | Sutherland et al. ........... 296/70 |
| 2001/0024035 A1 | * | 9/2001 | Scheib et al. ............... 280/779 |
| 2002/0038965 A1 | * | 4/2002 | Palazzolo et al. ........... 296/208 |
| 2002/0145309 A1 | * | 10/2002 | Shikata et al. .............. 296/208 |

FOREIGN PATENT DOCUMENTS

| FR | 2808480 A1 | 11/2001 |
|---|---|---|
| GB | 2347118 A | 8/2000 |

* cited by examiner

*Primary Examiner*—Kiran Patel
(74) *Attorney, Agent, or Firm*—Rothwell, Figg, Ernst & Manbeck

(57) ABSTRACT

A structural assembly (1) for a dashboard comprising a metal cross-member (2) extending in a direction of elongation and a structural member (4). The structural member, made of plastics material, moulded on the metal cross-member, has a passage forming an air duct (20). Said air duct ajoins the metal cross-member relative to which it extends substantially parallel.

6 Claims, 3 Drawing Sheets

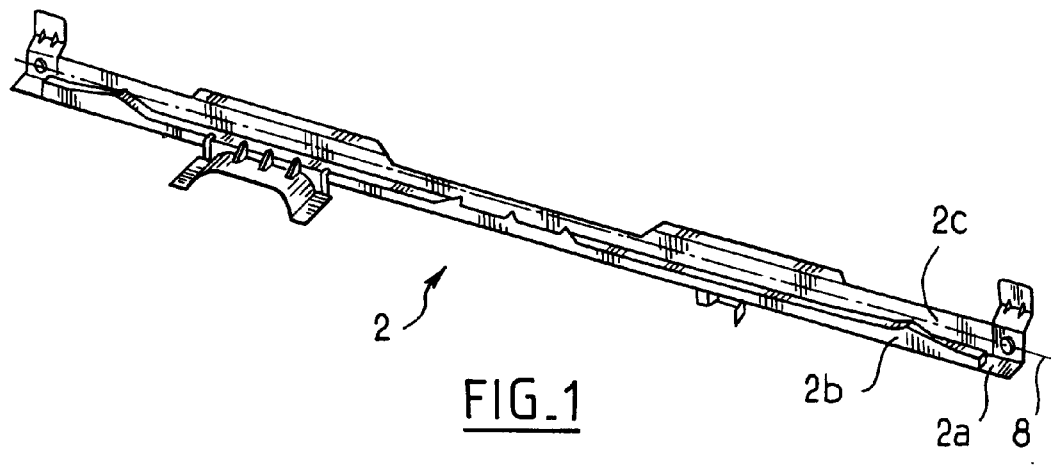
FIG_1
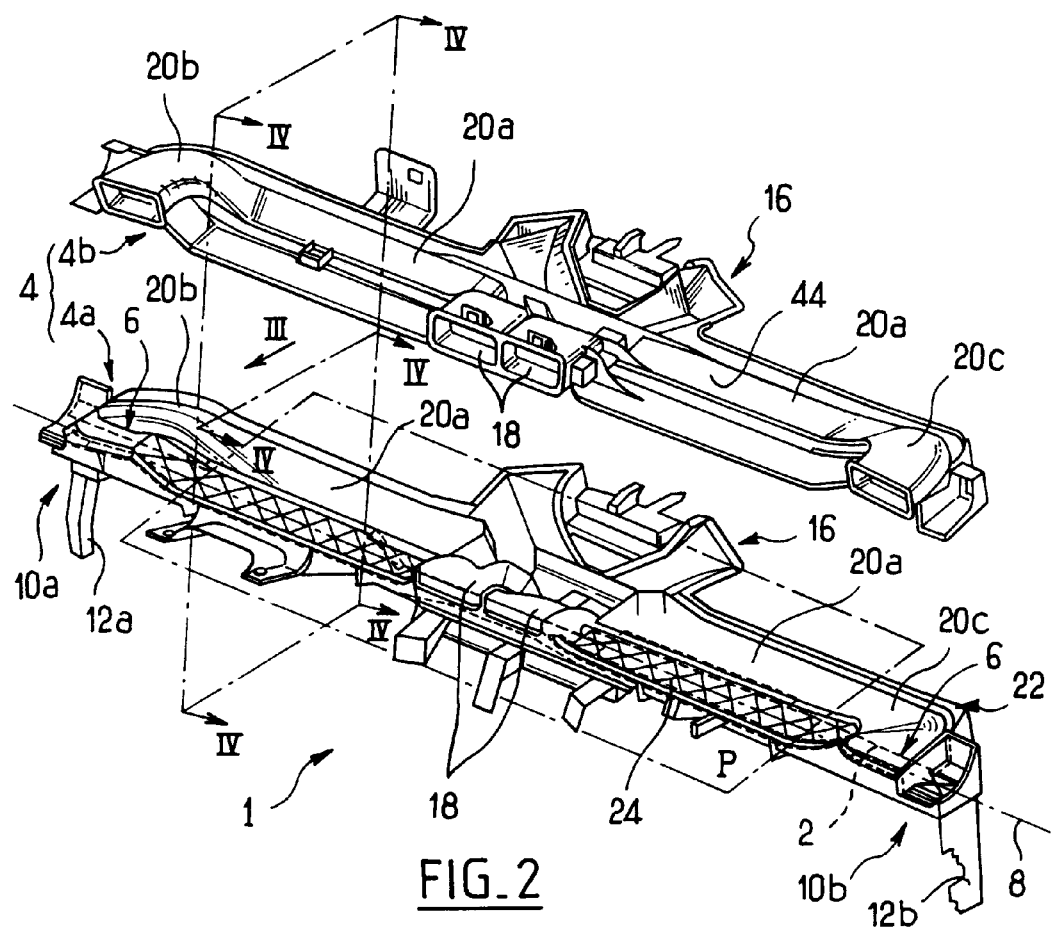
FIG_2

STRUCTURAL ASSEMBLY FOR DASHBOARD

BACKGROUND OF THE INVENTION

The invention concerns a structural assembly for a motor vehicle dashboard incorporating an air duct.

In a customary manner, dashboards are known which comprise a metal cross-member relative to which flexible air ducts are fixed.

On the other hand, U.S. Pat. No. 5,358,300 describes a dashboard structural assembly comprising a structural member consisting of a plurality of ribbed plates fixed to one another, defining air ducts between them and having a mechanical strength such that said assembly is devoid of a metal cross-member.

Moreover, FR-A-2 808 480 describes an air diffuser duct comprising a first member having sufficient rigidity to have a shape of its own and a second member having no rigidity of its own. These two members define between them an air circulation channel. In addition, a groove is provided in the first member for receiving electric cables and the second member covers over the groove, in order to maintain the electric cables therein. Said duct is fixed on a tubular cross-member belonging to the structure of the vehicle.

BRIEF SUMMARY OF THE INVENTION

The object of the invention is to propose a structural assembly which is easy to produce, robust, of reduced weight and offering optimum protection for the occupants of the vehicle in which said assembly will be mounted.

In order so to do, according to the invention, said assembly comprises:

a metal cross-member extending in a direction of elongation, and a structural member made of plastics material moulded on the metal cross-member and having a passage forming an air duct, said air duct being beside the metal cross-member relative to which it extends substantially parallel.

The metal cross-member takes up the essential part of the mechanical stresses, thereby guaranteeing great robustness and a relatively simple design. In addition, since the structural member not only provides the ventilation function, but in addition withstands part of the mechanical stresses, the metal cross-member may be of smaller section.

The over-moulding of the cross-member ensures a robust connection between the cross-member and the structural member, good cohesion and a good compactness of the assembly, as well as an improved simplicity of production.

Moreover, the relative arrangement of the structural member and of the cross-member ensures not only satisfactory distribution of the efforts between these two members, but above all, by improving the compactness, it increases the length of deformation of the vehicle before intrusion inside the passenger compartment.

In fact, in general, the vehicles comprise a connecting plate extending between the dashboard structural assembly and a secondary cross-member extending at the base of the windscreen and termed lower aperture cross-member. In the event of a shock, there is a risk of the connecting plate pushing the dashboard structural assembly inside the passenger compartment of the vehicle. By increasing the compactness of said dashboard structural member, the distance separating said lower aperture cross-member and the dashboard structural member is increased, in other words, the risk of intrusion inside the passenger compartment of the vehicle is reduced.

According to an advantageous feature according to the invention, the air duct has:

a main portion, substantially rectilinear, extending substantially in said direction of elongation in a substantially horizontal plane passing through the metal cross-member, at least one secondary portion, substantially curved, prolonging the main portion, departing gradually from said substantially horizontal plane and passing over the metal cross-member.

Thus, the metal cross-member is not mechanically weakened at the site of the overlap with the duct and the assembly frees a space in the dashboard above the main portion of the transverse structure for accommodating different accessories therein (air bag box, instrument panel, storage, etc.).

In a complementary manner, according to the invention, the cross-member has a section substantially having an open U-shape defining a hollow and the transverse structure comprises ribs extending into said hollow of the cross-member.

The U-shaped section makes it possible to obtain a satisfactory ratio between the mechanical strength and the weight. Moreover, it allows the ribs to be disposed easily within the hollow in order to prevent the section of the cross-member from distorting, without noticeably increasing the weight.

In a complementary manner, an advantageous feature of the invention making it possible to produce the assembly easily while preventing the air circulating in the duct from penetrating between the ribs, generating noise and losses of load, consists in that:

the structural member comprises a body incorporating the cross-member and a covering cap, between which the air duct extends, the air duct passes over the cross-member in an intersection zone, the assembly further comprises in the intersection zone a layer of ventilation foam extending over the ribs.

Thus, the body and the covering cap of the structural member may be easily obtained by moulding and the intersection zone does not have the aforementioned drawbacks.

The invention further proposes that the duct comprises a protuberance intended for fixing a vehicle steering column to the structural member and that the protuberance is filled at least partially with ventilation foam.

Thus, the shape of the structural member is adapted to support the steering column without complicating its production by moulding or disturbing the flow of air in the duct.

BRIEF DESCRIPTION OF THE SEVERAL VIEWS OF THE DRAWINGS

The invention will become clearer from the following description, provided with reference to the appended drawings, in which:

FIG. 1 is a perspective view of a metal cross-member according to the invention, FIG. 2 is an exploded perspective view of a structural assembly according to the invention.

DETAILED DESCRIPTION OF THE INVENTION

Figure 3:
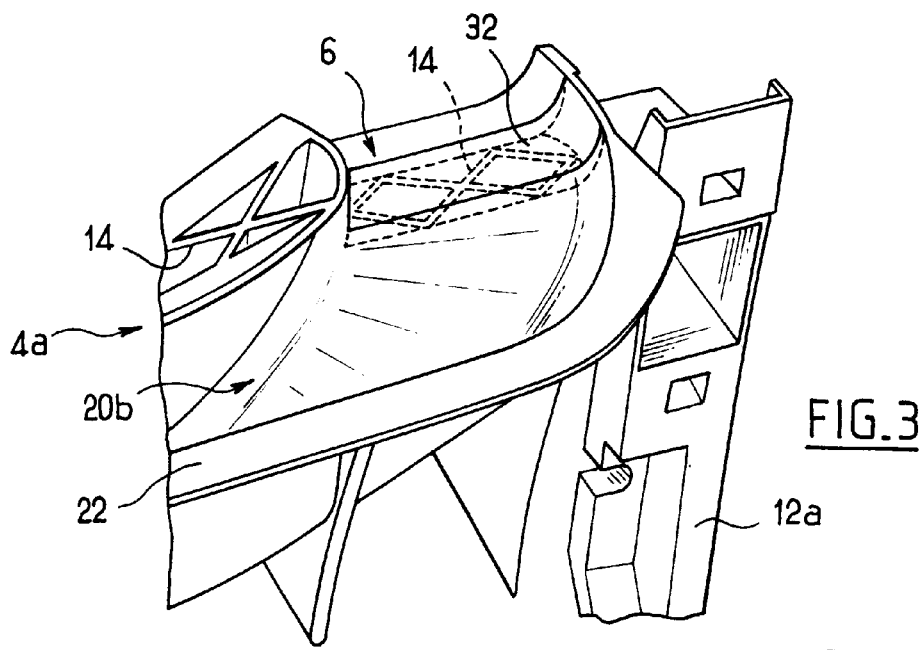
FIG. 3 is a partial perspective view in the direction of the arrow III in FIG. 2.
Figure 4:
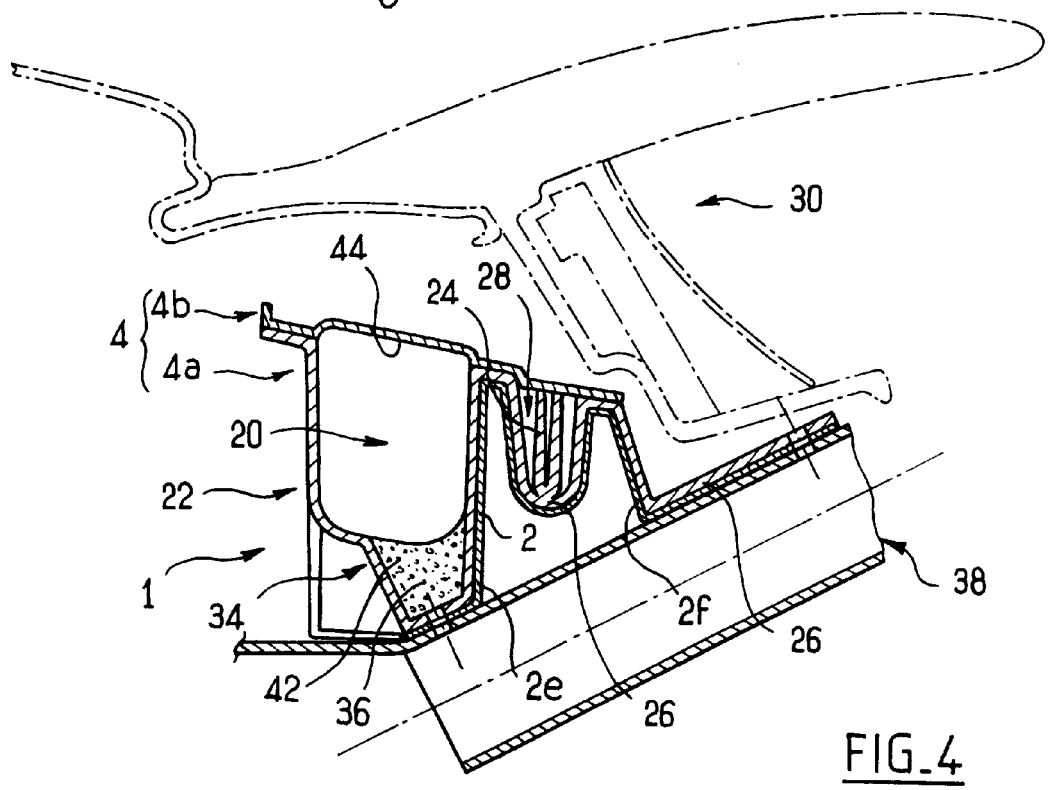
FIG. 4 is a sectional view in the plane IV—IV in FIG. 2.

As illustrated, the structural assembly 1 according to the invention comprises a metal cross-member 2 and a structural member 4. The structural assembly 1 is intended to be incorporated in a motor vehicle dashboard 30 (shown by dash/dotted lines in FIG. 4).

The cross-member 2 extends in a direction of elongation 8 and has a section substantially having a U-shape open at the top. In other words, diagrammatically, it essentially comprises a base 2a and two flanks 2b, 2c projecting perpendicularly to the base and extending substantially vertically and in the direction of elongation 8. The base 2a and the flanks 2b, 2c bound a hollow 28.

The structural member 4 is intended to extend transversely in the vehicle, to fulfill the function of distribution of conditioned air in the passenger compartment of the vehicle and to take up part of the efforts withstood by the cross-member 2. It ajoins the cross-member 2 and extends substantially in the direction of elongation 8 between a left-hand end 10a and a right-hand end 10b of the structural assembly.

It is made of plastics material and comprises a lower portion 4a forming a body and an upper portion 4b forming a covering cap. The lower portion 4a is moulded on the metal cross-member 2 and constitutes the essential part of the structural member. It comprises a casing portion 26 extending over the cross-member 2, criss-crossed ribs 24 projecting from the base 2a, into the hollow 28, and a chute 22.

The covering cap 4b comprises a surface 44 forming a cover closing off the upper portion of the chute 22 to define with it a transverse air duct 20 composed of two lateral portions.

The structural member 4 includes a ventilation assembly comprising, in addition to the transverse duct 20, a manifold 16 and central ducts 18.

The transverse duct 20 has a main portion 20a and secondary portions 20b, 20c. It extends along the cross-member 2, substantially in the direction of elongation 8, over its entire length at a distance e (see FIG. 5), advantageously less than 5 centimetres.

The main portion 20a communicates on the one hand with the ventilation manifold 16 and with the secondary portions 20b, 20c, substantially in an arc of a circle, opening out in proximity to the ends 10a, 10b of the structural assembly.

The main portion 20a is substantially rectilinear and extends in the direction of elongation 8. The main portion 20a and the cross-member 2 extend in a plane P which is substantially horizontal when the structural member is mounted on a vehicle. The secondary portions 20b, 20c of the duct 20 rise progressively above the plane P while approaching the ends 10a, 10b, so that the duct 20 passes over the cross-member 2 and the ribs 24 in intersection zones 6 located in proximity to each of the ends 10a, 10b.

In these intersection zones 6, the ribs 24 are covered with a layer of ventilation foam 32 flush with the surface of the chute 22, so that the duct 20 has a substantially constant section. The layer of foam 32 is advantageously made of plastics material, of the open-cell sound-absorbing type, treated on the surface to obtain a surface layer of closed cells.

The body 4a of the structural member 4, more precisely the chute 22, comprises a protuberance termed a beading 34, protruding downwards in the direction of a steering column support 38. Said beading 34 is reinforced by a wing 2e of the metal cross-member 2 which it covers. Said beading 34 and the metal cross-member 2 are fixed by screwing (shown diagrammatically in FIG. 4 by the axis line 40) to the steering column support 38, in order to connect the column support rigidly to the structural assembly 1.

The presence of the beading forms a hollow 42 at the bottom of the chute which is filled at least partly by a block of ventilation foam 36 similar to the layer 32. Thus, the structural member 4 can be easily obtained by moulding and the hollow 42 easily plugged.

The metal cross-member 2 has another wing 2f covered by the casing portion 26 which is also fixed to the steering column support 38.

After having produced the cross-member 2, over-moulded the structural member 4 and placed the layer of foam 32 in position in the hollow 28 and the block of foam 36 in the hollow 42, the covering cap 4b is welded on the body 4a to obtain a one-piece structural assembly.

Advantageously, the structural member 4 has a thickness of plastics material substantially equal to 3 mm.

The body 4a further incorporates pillars 12a, 12b located at the ends 10a, 10b and intended to be fixed to the front feet of the vehicle.

Figure 5:
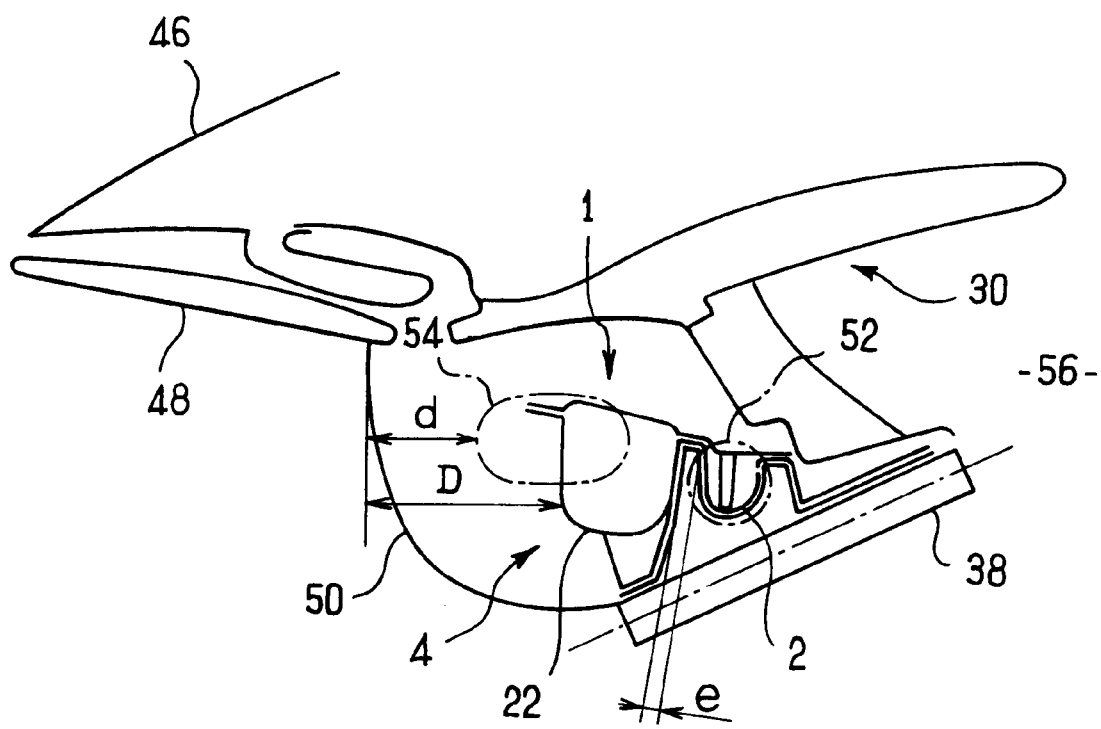
FIG. 5 is a diagrammatic view, in the plane IV—IV in FIG. 2, on a reduced scale relative to FIG. 4.

FIG. 5 shows diagrammatically the principle members disposed in proximity to the dashboard 30 and capable of producing an intrusion inside the passenger compartment of the vehicle. As illustrated, a metal connecting plate 50 connects the structural member 1 to a lower aperture cross-member 48 extending from the base of a windscreen 46.

A cross-member 52 and a flexible air duct 54 according to the prior art are shown by dash-dotted lines. The air duct 54 is separated from the connecting plate 50 by a distance d.

The narrow spacing e between the chute 22 and the cross-member 2, in other words, the extreme compactness of the structural assembly 1 of the invention, provides a crushing distance D, before said connecting plate 50 pushes on the structural member 1 towards a vehicle passenger compartment 56, which is greater than the distance d.

I claim:

1. A structural assembly for a dashboard comprising:
   a metal cross-member extending in a direction of elongation, and
   a structural member made of plastics material connected rigidly to the metal cross-member and having a passage forming an air duct, said air duct being beside the metal cross-member relative to which it extends substantially parallel, wherein the structural member is moulded on the metal cross-member; and wherein:
   the cross-member has a section substantially having an open U-shape defining a hollow,
   the structural member comprises ribs extending into said hollow of the cross-member.

2. The assembly according to claim 1, wherein the air duct has:
   a main portion, substantially rectilinear, extending substantially in said direction of elongation in a substantially horizontal plane passing through the metal cross-member,
   at least one secondary portion, substantially curved, prolonging the main portion, departing gradually from said substantially horizontal plane and passing over the metal cross-member.

3. The assembly according to claim 2, wherein:

the assembly has two end zones in the direction of elongation, the assembly comprises two secondary portions located in each of said end zones.

4. The assembly according to claim 1, wherein:

the structural member comprises a body incorporating the cross-member and a covering cap, between which said air duct extends, the air duct passes over the cross-member in at least one intersection zone, the assembly further comprises in the intersection zone a layer of ventilation foam extending over the ribs.

5. The assembly according to claim 1, wherein the air duct comprises a protuberance intended for fixing a vehicle steering column to the structural member and in that the protuberance is filled at least partially with ventilation foam.

6. The assembly according to claim 1, wherein over its entire length the air duct is spaced less than 5 centimetres with respect to the metal cross-member.

* * * * *